INVENTOR.

GEORGE R. URQUHART

BY Edwin D. Grant

ATTORNEY

United States Patent Office 3,516,511
Patented June 23, 1970

3,516,511
METHOD AND APPARATUS FOR AUGMENTING THE THRUST AND SUPPRESSING THE NOISE OF AN AIRCRAFT JET ENGINE
George R. Urquhart, El Cajon, Calif., assignor to Rohr Corporation, a corporation of California
Filed May 22, 1969, Ser. No. 826,884
Int. Cl. B64d 33/06; F01n 1/14
U.S. Cl. 181—35    10 Claims

ABSTRACT OF THE DISCLOSURE

The inner surface of a tubular jet aircraft thrust augmenting ejector is formed with a multiplicity of perforations that respectively communicate with resonating cavities in the wall of the ejector. The jet stream flowing through the ejector is prevented from detaching from the inner surface of the latter by flow of a portion of the boundary layer of said stream into holes which terminate within an area encircling the aft portion of said inner surface and which communicate with the forward portion of the ejector throat through a passage in the wall of the ejector.

SUMMARY OF THE INVENTION

This invention relates to jet propulsion and more particularly to an improved ejector construction and a method for both augmenting the thrust of an aircraft jet engine and suppressing the noise thereof.

As is well-known, the thrust of a jet-propelled aircraft can be increased by positioning a tubular ejector downstream from an engine of the aircraft so that atmospheric air flows through the ejector along with the jet stream issuing from the engine. However, the efficiency of tubular ejectors of certain geometric configuration is reduced by the separation of the stream of thrust gas and air from the inner surface of the ejector at the aft end thereof. Another disadvantage of conventional ejectors is that they act as reflectors for sound energy associated with jet streams discharged therethrough and also for sound energy generated by the engines forward thereof.

In accordance with this invention, a portion of the boundary layer of the jet stream flowing through a tubular ejector is permitted to flow through holes located within the annular area on the inner surface of said ejector where flow separation normally occurs, the removed portion of the jet stream passing through a passage in the wall of the ejector to the forward end of said ejector where it is discharged into the jet stream around the periphery thereof. Thus separation of the jet stream from the aft portion of the throat of the ejector is prevented, and the thrust of a jet propulsion plant is increased without requiring additional power input thereto. The ejector comprises concentrically disposed, tubular inner and outer walls which are joined together at the forward and aft ends thereof, and honeycomb core material bonded to the inner surface of at least one of said walls, said inner wall including the openings through which the aforementioned portion of the jet stream is removed from the aft section of the ejector throat and discharged into the forward section of said throat and also including a multiplicity of perforations which respectively communicate with the cells of said honeycomb core material. Thus in an ejector constructed as described sound is absorbed within the cellular wall thereof, and the construction of said wall is also such that said ejector is strong, relatively light in weight, and economical to manufacture.

OBJECTS OF THE INVENTION

It is accordingly an object of this invention to provide a method for both increasing the thrust of a jet stream flowing through a tubular ejector and suppressing the noise of said jet stream.

Another object of the invention is to provide an improved tubular aircraft thrust augmenting ejector having a strong, lightweight wall construction and greater thrust augmenting and sound suppressing capacity than that of ejectors of the same type which have been heretofore available.

An additional object is to provide an efficient tubular thrust augmenting ejector which can be economically manufactured.

DESCRIPTION OF THE DRAWINGS

In the drawings.

Throughout the drawings and the following specification, the same numbers designate the same parts.

DETAILED DESCRIPTION

Figure 1:
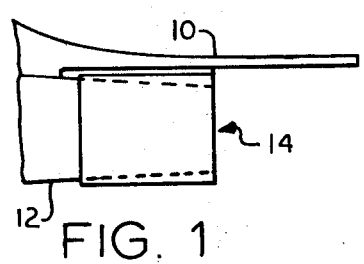
FIG. 1 is a side elevation of an exemplary embodiment of the invention, illustrating the ejector thereof in a retracted position wherein it is disposed around the aft end of a jet engine nacelle.

As illustrated in FIG. 1, one embodiment of this invention comprises a hollow pylon 10 one end of which is fixedly attached to a nacelle 12 containing an aircraft jet engine. The longitudinal axis of pylon 10 is parallel with the longitudinal axis of the thrust nozzle of the jet engine, which nozzle is substantially coterminous with the aft end of nacelle 12. A tubular ejector, generally designated by the number 14, comprises a tubular outer wall 16 having a support member 18 fixedly joined to the upper portion of the outer surface thereof (see FIGS. 2 and 3). More particularly, the aforesaid support member extends between the ends of the ejector and has a flat upper surface from which four arms 20 project, said arms being respectively disposed in pairs adjacent the forward and aft ends of support member 18 and each arm being spaced a short distance from a respective one of the longitudinally extending upper edges of said support member. A roller 22 is mounted on each arm 20 and engages the upper surface of a respective one of two flanges 24A, 24B which extend longitudinally of pylon 10 and which project laterally and inwardly from the lower edges of the sides thereof. The lower edge portions of flanges 24A, 24B respectively slidably abut the portions of the upper surface of support member 18 which are disposed between the longitudinal edges of said support member and arms 20, and the end surfaces of said flanges respectively slidably abut the sides of said arms, thus permitting movement of ejector 14 along pylon 10 while maintaining it in coaxial relation with the aforementioned thrust nozzle.

A motor 26 is fixedly positioned within the interior of pylon 10 at the forward end thereof. Mounted on the drive shaft 28 of this motor is a sprocket 30, these components being illustrated in phantom in FIG. 2. Another sprocket 32 is rotatably mounted on a support arm 34 which depends from the upper portion of pylon 10 and which is located within the interior of said pylon adjacent the aft end thereof. A continuous drive chain 36 is engaged with sprockets 30 and 32 and is fixedly attached to a lug 38 which projects from the upper surface of support member 18 and is integrally joined thereto. Thus motor 26 can be operated to move ejector 14 between a retracted position wherein it is disposed around the aft end of nacelle 12 (as illustrated in FIG. 1) and a deployed position wherein its forward end is even with the aft end of said nacelle. Conventional control means are operatively connected to the motor and to switches located in the cockpit of the aircraft of which nacelle 12 is a part, so that the ejector can be either retracted or deployed at any selected time.

Extending circumferentially of the inner surface of outer wall 16 is an inner core of honeycomb material, generally designated by the number 40. More explicitly, a recess extends around the side of core 40 nearest the outer wall of the ejector, the forward and aft edges 42, 44 of this recess being respectively parallel with and located near the forward and aft edges of said ejector. The cell walls of the honeycomb core are normal to the inner surface of outer wall 16, and those edges of the cell walls which abut the inner surface of the outer wall forward and aft of the recess in said core are bonded to said inner surface by suitable means, such as an adhesive. It will also be noted in FIG. 2 that the thickness of core 40 is maximum midway between the ends of the ejector, the core gradually decreasing in thickness as said ends are approached. Disposed within the recess of the core and bonded by suitable means to the edges of the cells of said core which are disposed over said recess is a tubular panel 46. Thus there is an annular passage 48 between the aforesaid panel and outer wall 16, which passage extends longitudinally of the ejector and is closed to the cells of core 40. A tubular inner wall 50 is bonded to the inner side of the core and extends circumferentially thereof, said inner wall containing closely spaced holes 52 over the entire surface thereof (these perforations being illustrated only in limited areas in FIG. 2 in order to simplify the drawings). These holes respectively communicate with cells of core 40. Inner wall 50 also contains a plurality of holes 54 which are disposed within an annular area extending circumferentially of the ejector adjacent the aft end thereof, as well as a plurality of holes 56 which are disposed with an annular area extending circumferentially of the ejector adjacent the forward end thereof. Each hole 54 communicates with a duct 58 which extends through core 40 and which in turn communicates with the aft portion of passage 48 through an aperture 60 in panel 46. Each hole 56 is likewise placed in communication with the forward portion of passage 48 by means of a duct 62 which extends through the core to an aperture 64 in panel 46. The inner end (i.e., the end nearest passage 48) of each duct 58, 62 is forward of the outer end of the duct.

The forward and aft edges of inner wall 50 and outer wall 16 are respectively attached to annular wall members 66, 68. Such annular wall members may also be bonded to the forward and aft edges 42, 44 of the recess in the core.

Figure 2:
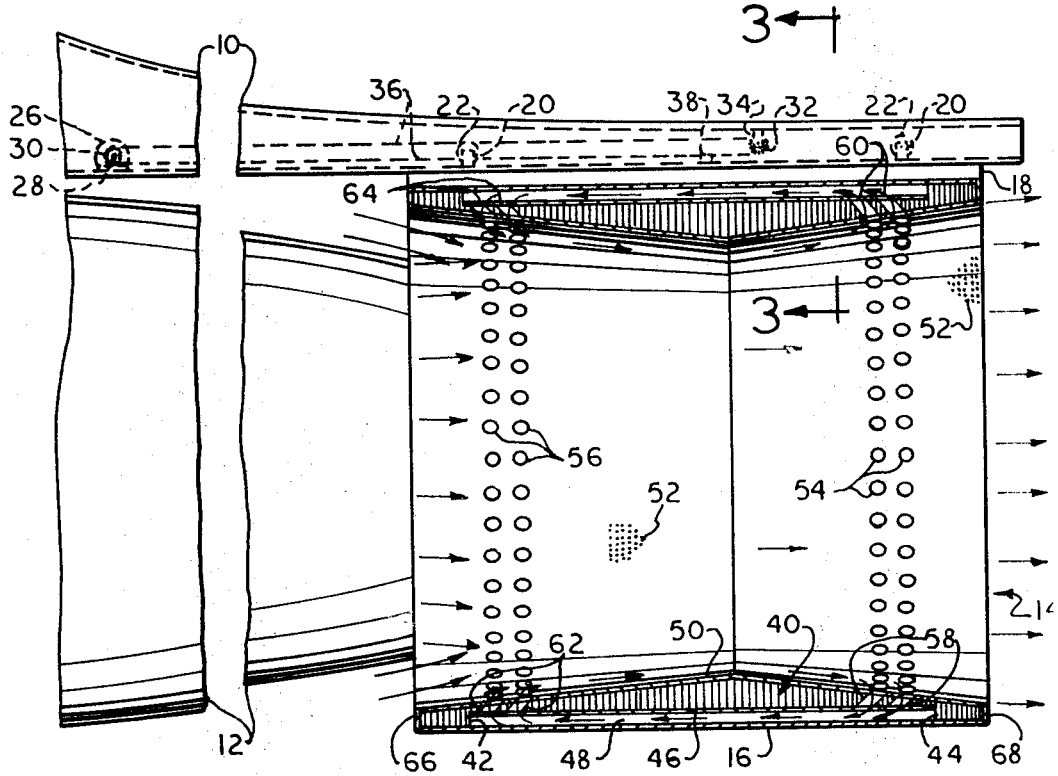
FIG. 2 is an enlarged side elevation of the same embodiment, the aforesaid ejector being illustrated in longitudinal section and in a deployed position downstream from said nacelle, and the latter and a pylon mounted thereon being illustrated in fragmentary form.
Figure 3:
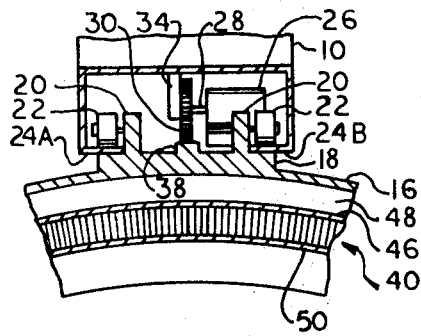
FIG. 3 is a detail cross sectional, fragmentary view of components of the same embodiment, taken along the plane represented by line 3—3 in FIG. 2 and in the direction indicated in the latter drawing.
Figure 4:
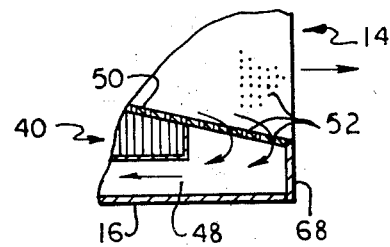
FIG. 4 is a fragmentary detail view of a modification of a portion of the embodiment illustrated in FIGS. 1–3.

It will be apparent that the number and diameter of the holes 54, 56 may be different from what is shown in FIG. 2, wherein the size of said holes is exaggerated. Furthermore, the holes 56 at the forward end of the ejector may be replaced by an annular opening which extends from the inner surface of the ejector to the forward end of passage 48. The passage may also communicate with the channel, or throat, of the ejector through porous panels which form part of the ejector wall at the forward and aft ends of the inner surface thereof. In some embodiments of the invention a multiplicity of narrow slots may be substituted for holes 54, 56 having a circular cross section. In the modification of ejector 14 which is illustrated in FIG. 4, the honeycomb core material 40 does not extend under the aft portion of inner wall 50, and those holes 52 in said inner wall which are located aft of the honeycomb core communicate with passage 48, thus eliminating the necessity for holes 54 and the ducts 58 which place the latter holes in communication with said passage in the embodiment of the invention illustrated in FIG. 2. The honeycomb core may also be spaced from the forward edge of the ejector so that passage 48 will communicate with the forward portion of the throat of said ejector through the holes 52 located adjacent said forward edge.

OPERATION

During cruise flight of an aircraft provided with the above-described thrust augmenting and sound suppressing apparatus, ejector 14 is positioned at the forward end of pylon 10 and disposed around the aft end of nacelle 12 as illustrated in FIG. 1. When thrust augmentation and sound suppression are required, motor 26 is operated to move the ejector to the downstream position illustrated in FIG. 2, at which time the thrust of the jet stream issuing from the thrust nozzle within nacelle 12 is augmented by the flow of atmospheric air into the ejector. A portion of the stream of air and exhaust gas flowing through the ejector enters the holes 54 at the aft end of its throat and flows in the forward direction through passage 48 and out of the holes 56 at the forward end of the latter. This flow of a portion of the jet stream through holes 54 (illustrated by arrows in FIG. 2) causes the expansion boundary of said jet stream to remain attached to the inner surface of inner wall 50 aft of said holes and is effected by the pressure gradient along the said inner wall, the pressure being greater at holes 54 than it is at holes 56. The thrust produced by the propulsion assembly is thus greater than that which would be attained if the stream flowing through the ejector separated from the wall thereof at the point where holes 54 are located, as can occur in tubular ejectors which have certain geometric proportions and which are not provided with the described means for boundary layer control.

The cells of the honeycomb core 40 which forms part of the wall of ejector 14 communicate with the throat of said ejector through holes 52 in inner wall 50, but the ends of said cells remote from the latter are closed by either outer wall 16 or panel 46. Thus the cells of the core serve as resonating cavities for sound energy which enters holes 52, i.e., cavities in which such energy is dissipated by transformation into heat energy. Such sound energy includes noise generated by the jet engine within nacelle 12 and emitted from the aft end of the latter, and noise associated with the high energy jet stream discharged through the ejector. In addition, the arrangement of inner and outer walls 16, 50, core 40 and panel 46 is such that ejector 14 has great rigidity, while also being light in weight and economical to manufacture.

Although the invention has been described with reference to a particular embodiment of the same, it should not be considered to be limited thereto for various modifications could be made therein by one having ordinary skill in the art without departing from the spirit and scope of the invention as defined in the following claims.

What is claimed as new and useful and desired to be secured by U.S. Letters Patent is:

1. A method of suppressing the noise of a jet engine and increasing the thrust thereof, which comprises discharging the thrust gas of said engine through a tubular ejector having a sound absorbing material on the inner surface thereof and simultaneously introducing atmospheric air into said ejector, admitting a portion of the boundary layer of said thrust gas and air into holes which terminate within an area encircling the aft portion of said inner surface and which communicate with the forward portion of the throat of said ejector through at least one passage extending longitudinally through the wall of said ejector, and discharging said admitted portion of said thrust gas and air into the throat of said ejector at the forward end thereof.

2. A thrust augmenting ejector for jet-propelled aircraft, comprising tubular, concentrically disposed inner and outer walls joined together at the forward and aft ends thereof, honeycomb core material bonded to the inner surface of said inner wall, said inner wall containing holes which respectively communicate with cells of said honeycomb core material to thereby provide resonating cavities for sound energy associated with thrust gas flowing through said ejector, said inner wall also containing holes which are disposed within an annular area extending circumferentially of said ejector adjacent the aft end thereof and which communicate with at least one passage extending longitudinally of said ejector between said inner and outer walls thereof, said passage communicating through at least one opening in said inner wall with the forward portion of the throat of said ejector, said cells being closed to said passage.

3. An ejector as defined in claim 2 wherein said honeycomb core material is spaced from the inner surface of said outer wall and from the holes which are formed in said inner wall adjacent the aft end of said ejector, said passage consisting of the space between said honeycomb core material and said outer wall and the space between the latter and said inner wall at the aft end of said ejector.

4. An ejector as defined in claim 2 wherein said opening in said inner wall is a slot encircling the throat of said ejector.

5. An ejector as defined in claim 2 wherein said passage encircles the throat of said ejector.

6. An ejector as defined in claim 5 wherein said passage communicates with the forward portion of the throat of said ejector through a plurality of holes extending through said inner wall and honeycomb core material and disposed circumferentially about said throat.

7. An ejector as defined in claim 6 wherein said honeycomb core material is spaced from the holes which are formed in said inner wall at the forward end of said ejector.

8. An ejector as defined in claim 6 wherein said holes which place said passage in communication with the forward portion of the throat of said ejector are inclined relative to the longitudinal axis of said ejector so that their inner ends are forward of their outer ends.

9. An ejector as defined in claim 2 wherein said passage communicates with the forward and aft portions of the throat of said ejector through porous sections of the ejector wall.

10. An ejector as defined in claim 2 wherein the side of said honeycomb core material nearest said outer wall is formed with a circumferentially extending recess the forward and aft edges of which are respectively located near the forward and aft edges of said ejector, and including a tubular panel disposed within said recess and bonded to the edges of said cells disposed over said recess, said passage consisting of the space between said panel and said outer wall.

References Cited
UNITED STATES PATENTS

| | | | |
|---|---|---|---|
| 2,948,115 | 8/1960 | Dunsworth et al. | 239—265.17 |
| 2,971,327 | 2/1961 | Moy et al. | |
| 3,067,968 | 12/1962 | Heppenstall. | |
| 3,244,255 | 4/1966 | Possell. | |
| 3,374,954 | 3/1968 | Card | 239—265.17 XR |

ROBERT S. WARD, Jr., Primary Examiner

U.S. Cl. X.R.

181—51